United States Patent [19]

Whitfield

[11] Patent Number: 5,029,652
[45] Date of Patent: Jul. 9, 1991

[54] TURF AERATOR WITH LATERAL TINE MOVEMENT

[76] Inventor: Carroll J. Whitfield, 1709 Slack Dr., Tifton, Ga. 31793

[21] Appl. No.: 489,210

[22] Filed: Mar. 5, 1990

[51] Int. Cl.$^5$ .............................................. A01B 45/02
[52] U.S. Cl. ......................................... 172/21; 172/1;
    172/118; 172/97; 172/457
[58] Field of Search .................... 172/21, 35, 40, 47,
    172/48, 54, 54.5, 60, 84, 88, 90, 91, 92, 94, 95,
    97, 122, 124, 439, 445, 449, 450, 457, 118, 123

[56] References Cited

U.S. PATENT DOCUMENTS

| | | | |
|---|---|---|---|
| 160,489 | 3/1875 | Webster | 172/97 X |
| 1,186,375 | 6/1916 | Burrows | 172/97 |
| 2,752,838 | 7/1956 | Rudio | 172/457 X |
| 2,759,310 | 8/1956 | Newkirk | 172/449 X |
| 2,813,389 | 11/1957 | Padrick | 172/457 X |
| 3,706,346 | 12/1972 | Vissers | 172/449 X |
| 3,747,687 | 7/1973 | Bodine | 172/21 X |
| 4,202,415 | 5/1980 | Barlage | 172/118 X |

FOREIGN PATENT DOCUMENTS

| | | | |
|---|---|---|---|
| 366794 | 9/1938 | Italy | 172/118 |
| 934927 | 6/1982 | U.S.S.R. | 172/97 |

Primary Examiner—Dennis L. Taylor
Assistant Examiner—Jeffrey L. Thompson
Attorney, Agent, or Firm—Thomas, Kerr & Kayden

[57] ABSTRACT

An apparatus for aerating turf including a mounting frame (11) for mounting the apparatus to the hydraulic lift system (12) of a utility tractor. A trailer support frame (13) is pivotably mounted to the mounting frame (11) so as to enable the trailer support frame (13) to tilt toward and away from engagement with the turf. A plurality of rotary hoes (39) are supported within the trailer support frame (13) along a drive shaft (41). The drive shaft (41) is rotated by the power take-off (44) of the tractor, and causes the rotary hoes (39) to vibrate as the tines (58) of the rotary hoes (39) penetrate the soil so as to aerate the turf without causing compaction of the soil.

18 Claims, 4 Drawing Sheets

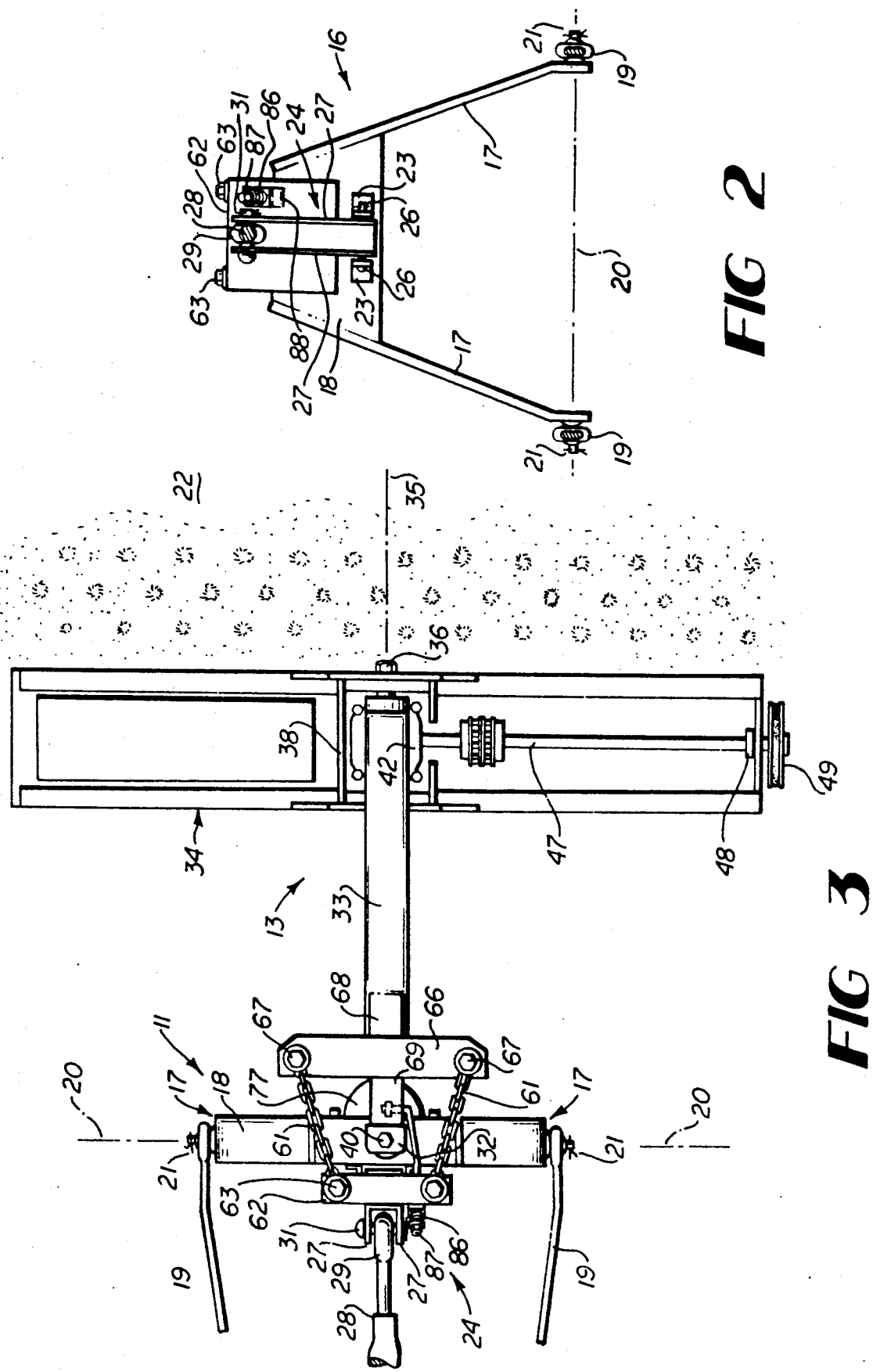

TURF AERATOR WITH LATERAL TINE MOVEMENT

FIELD OF THE INVENTION

The present invention relates in general to a device for aerating turf. More particularly, the invention relates to a method and apparatus for aerating the roots of grass and other ground cover vegetation by forming a pattern of holes extending into the ground surface to the roots of the grass etc. so as to expose the root structure of the turf to air, moisture and nutrients in order to stimulate root growth.

BACKGROUND OF THE INVENTION

In the treatment and care of turf such as grass or other ground covers of lawns, golf courses, softball fields, and the like, it is highly desirable to aerate the turf so as to enable air, moisture and nutrients to reach the roots of the grass, etc. The aeration of turf is generally performed by forming a pattern of holes in the turf. This tends to disturb the soil and roots beneath the surface of the ground cover and when moisture and fertilizers are applied to the turf, the root structure of the turf is able to directly absorb these nutrients and thereby the growth of the root structure is stimulated, making the turf healthier. Some of the prior art aerators typically have a plurality of coring tines which penetrate the soil and cut a generally cylindrical core or plug in the turf, and when the coring tines are removed from the turf they usually lift the core out of the ground, leaving a residue of cores of soil on the surface of the ground. The residue of cores of soil is undesirable on lawns and on playing fields such as golf courses and baseball fields where the condition of the surface of the turf is very important to the sports person. A type of core producing aerator is disclosed U.S. Pat. No. 4,773,486.

The typical prior art turf aerator utilizes its own weight to cause its coring tines to penetrate the turf. As a result of this force which presses the coring tines downwardly into the soil, some of the soil beneath the tines of the aerator and some of the soil at the sides of the tines becomes compacted. Such compaction of the soil tends to prevent moisture and fertilizers from reaching the root structure of the turf and thus tends to defeat the purpose of aerating the turf.

Accordingly it can be seen that it is desirable to produce a method and apparatus which performs the function of aerating turf while significantly reducing compaction of the soil and without leaving cores of soil on the ground surface, and which forms openings in the surface of the turf and disturbs the soil to stimulate the growth of the root structure of the ground cover.

SUMMARY OF THE INVENTION

Briefly described, the present invention comprises a method and apparatus for aerating grass turf and other ground covers by forming holes through the surface to the roots of the turf with the tines of rotary hoes, and moving the distal ends of the tines laterally while extending into the ground so as to loose and otherwise disturb the soil at the level of the roots while causing a minimum change to the turf at the surface of the ground.

In a preferred form of the invention, the turf aerator comprises a unit supported on the power arms of the hydraulic lift system of a utility tractor and held at the surface of the turf. The aerator is hitched to the rear of the tractor by a conventional three-point hitch which includes a power take-off drive shaft. The use of a three point hitch enables the aerator to be raised and lowered s as to selectively engage the ground surface and to follow the contour of the land as the tractor moves over hills.

The turf aerator has a plurality of rotary hoes each of which includes a plurality of tine elements, and the rotary hoes are mounted on a common drive shaft of the framework of the trailer unit. The rotary hoes each include a bearing mounted to the drive shaft so that the rotary hoes freely rotate about the drive shaft. The bearings of each rotary hoe are mounted at an angle with respect to the longitudinal axis of the drive shaft so that when the drive shaft of the turf aerator is driven by the rotation of the power take-off of the tractor, the bearings of the rotary hoes revolve about the drive shaft and the revolving bearings cause the tine elements of the rotary hoes to vibrate or wobble from side to side.

When the turf aerator is lowered into engagement with the ground by the hydraulic lift system of the tractor, the downwardly facing tines of the rotary hoes penetrate the turf. When the tractor is not moving and the power take-off of the tractor has been engaged, the drive shaft will rotate. The tines of the rotary hoes wobble from side to side as the drive shaft is rotated, creating a burrowing motion of those tines engaging the turf. The tines move back and forth in the soil so as to disturb the soil as the tines progressively penetrate the soil.

When the tractor moves either forwardly or rearwardly the tine elements which are in engagement with the turf cause the rotary hoes to rotate about the drive shaft with the rotary hoes tending to "walk" in the turf. As the rotary hoes walk in the turf the tines which are initially embedded within the soil are raised out of the soil as other tines are rotated downwardly into engagement with and penetrate the turf. If the tractor is moved forwardly with the power take-off rotating the drive shaft of the turf aerator, thus causing tine elements to wobble from side-to-side, the tine elements will burrow into and out of the soil as they walk forward with the movement of the tractor.

If the power take-off of the tractor is not engaged and thus the drive shaft is not rotating, the rotary hoes will not wobble but will freely rotate about the drive shaft. Consequently, the rotary hoes will simply walk in the turf with the movement of the tractor, forming holes in the turf, but with less soil penetration.

Therefore, it is an object of this invention to provide a method and apparatus for aerating turf to expose the root structure of the turf to air, water and nutrients to stimulate root growth, while causing a minimum of compaction of the soil with increased penetration and lateral disruption of the ground surface.

Another object of this invention is to provide a method and apparatus of aerating turf by walking rotary hoes through the turf and vibrating the tines of the rotary hoes from side to side so as to burrow the tines into the turf and disturb the root structure of the turf with minimal damage to the surface of the turf.

Another object of this invention is to provide an improved trailer unit turf aerator to be supported by the hydraulic lift system of a tractor and hitched to the rear of the tractor so as to be pivotable about vertical and longitudinal axes at the rear of the tractor so as to follow the contours of the turf.

Other objects, features and advantages of the invention will become apparent upon reading the following specification, when take in conjunction with the accompanying drawings.

BRIEF DESCRIPTION OF THE DRAWINGS

FIG. 2 is an end view of the hitch A-frame which is attached to the hydraulic lift system of the tractor.

FIG. 3 is a plan view of the turf aerator illustrating the three point configuration of the hitch which supports the trailer unit on the hydraulic arms of the lift system of the tractor.

DESCRIPTION OF THE PREFERRED EMBODIMENT

Figure 1:
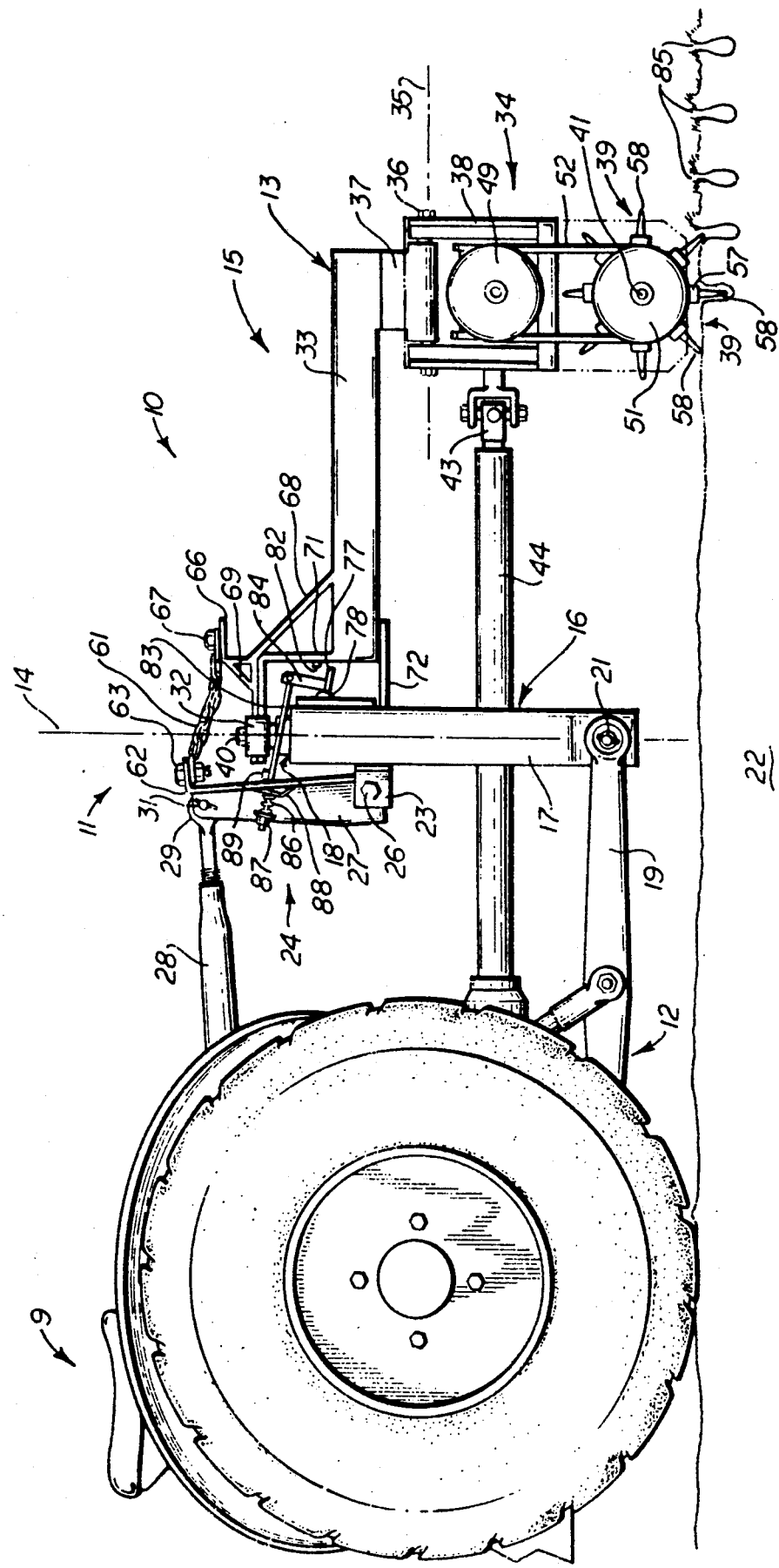
FIG. 1 is a side elevational view of the turf aerator which is a trailer unit hitched to the hydraulic lift system of a tractor.

Referring now in more detail to the drawings in which like numerals indicate like parts throughout the several views, FIG. 1 illustrates the turf aerator 10 for use with a conventional tractor, preferably a mid-size utility tractor 9 (partially shown) of the type commonly used for lawn care. The turf aerator 10 comprises a trailer unit 15 having a mounting support frame 11 mounted to the hydraulic lift system 12 at the rear of the tractor 9, and a trailer frame 13 attached to the mounting support frame 11 so as to be pivotable about an upwardly extending pivot axis 14. Mounting support frame 11 is mounted to the hydraulic lift system 12 by a hitch A-frame 16 (FIG. 2) which has a pair of A-frame side arms 17 that diverge downwardly and away from a horizontal cross brace 18. The A-frame side arms 17 and cross brace 18 form the hitch A-frame 16.

Each A-frame side arm 17 of hitch A-frame 16 is pivotally attached at its lower end to one of the power arms 19 (FIG. 1) of the tractor's hydraulic lift system 12 by a hinge pin 21. The power arms 19 and the upper control arm 28 of the hydraulic lift system 12 of the tractor 9 support the turf aerator 10, holding the turf aerator 10 above the surface of the turf 22, and the raising and lowering of the arms 19 and 28 raise and lower the turf aerator with respect to the ground surface.

Hinge pins 21 at the lower ends of A-frame side arms 17 enable the hitch A-frame 16 and the trailer frame 13 of the turf aerator 10 to tilt vertically about the lateral axis 20 formed by the hinge pins 21 to follow the contour of the turf 22 and to be raised away from its lowered position out of engagement with the turf 22 for transport to another work site.

Support brackets 23 is affixed along the lower edge of the front surface of cross brace 18 of hitch A-frame 16 facing forwardly toward the tractor. The support brackets 23 are welded to the front surface of cross brace 18 and are attached to the lower end of tiltable support link 24 by pins 26. The support brackets 23 straddle the outside surfaces of the horizontally extending side walls 27 of the tiltable support link 24. Pins 26 are inserted through aligned openings in each support bracket 23 and the side wall 27 of the tiltable support link 24 adjacent each support bracket 23 so as to pivotably affix hitch A-frame 16 and its cross-brace 18 to the tiltable support link 24.

As shown in FIG. 1, the stabilizing arm 28 of the hydraulic lift system 12 of the tractor is connected at its distal end to side walls 27 of tiltable support link 24. The connecting eye bolt 29 of the stabilizing arm 28 is positioned between the side walls 27 of the tiltable support link 24, at the upper end of the tiltable support link 24, and is secured to the upper end of the tiltable support link 24 by a pin 31. Pin 31 is inserted through both side walls 27 and the center of the eyebolt 29 to pivotably secure the tiltable support link 24 to the stabilizing arm 28.

Figure 4:
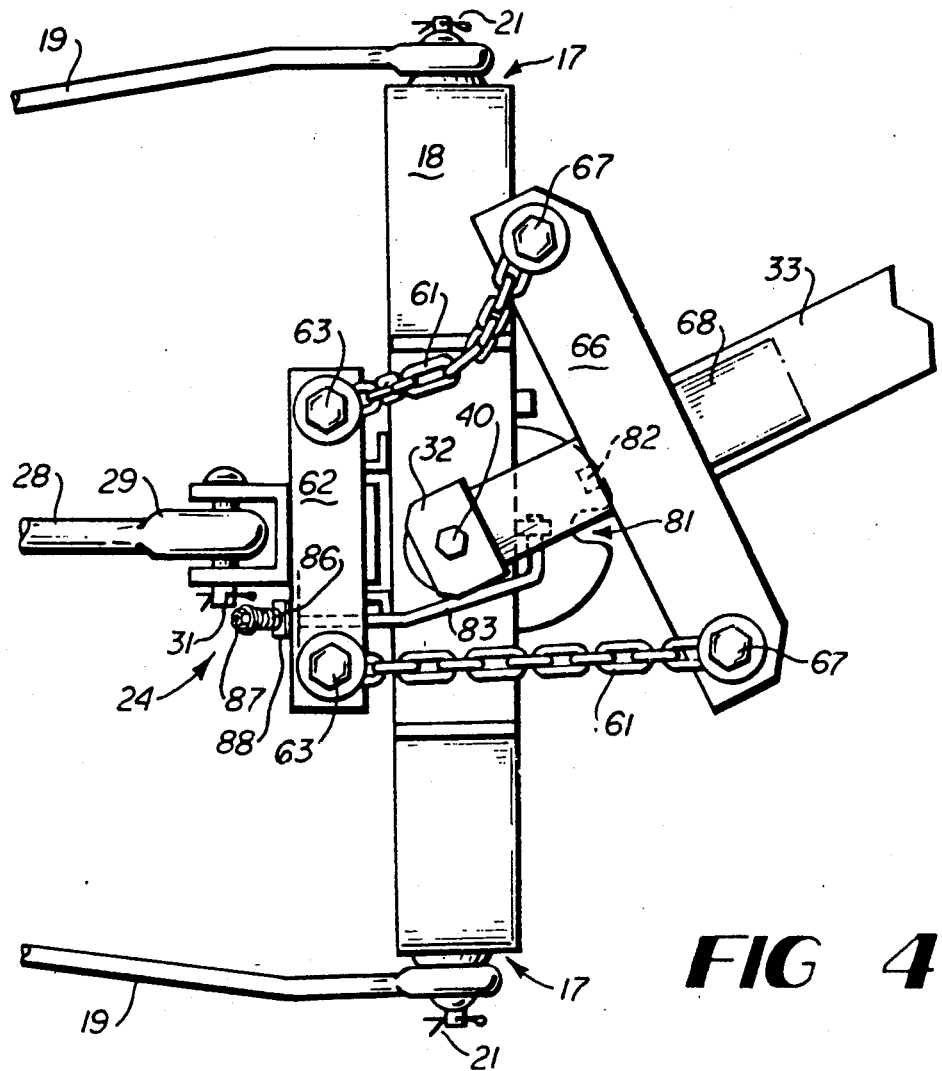
FIG. 4 is a plan view of the turf aerator similar to FIG. 3, but illustrating the turning motion of the trailer support frame with respect to the mounting support frame as limited by the support chains.

As illustrated in FIGS. 1, 3 and 4, a vertical pivot joint 32 is formed through cross brace 18 of hitch A-frame 16, by the pivot pin 40 extending downwardly through pivot joint 32, through horizontal cross-brace 18 of the hitch A-frame 16 and into horizontal brace 72 (FIG. 1), approximately in the center of cross brace 18 and forms the upwardly extending pivot axis 14 (FIG. 1). The trailer frame 13 of the turf aerator 10 is attached to the mounting support frame 11 by the vertical pivot joint 32, and swings about upwardly extending pivot axis 14 so as to trail behind the tractor as the tractor advances through a turn. Other type trailer unit gardening implements can be mounted to and trail behind the mounting support frame.

As illustrated in FIGS. 1 and 3 the trailer frame 13 comprises an elongate carriage support beam 33. One end of the carriage support beam 33 is attached to the mounting support frame 11, while the opposite end of the carriage support beam 33 pivotally supports a rectangularly shaped rotary hoe carriage 34 on a dowel or pin 36. The dowel 36 enables the rotary hoe carriage 34 to tilt about a longitudinal axis 35, thus enabling the turf aerator to be used to aerate turf 22 as the tractor moves across hills and sloped terrain during which the tractor tilts with respect to the trailer frame. Spacer block 37 is mounted to the lower distal end of support beam 33, and mounting bracket 38 is attached to the upper surface of rotary hoe carriage 34 (FIG. 3). Dowel 36 pivotably connects the rotary hoe carriage 34 to carriage support beam 33 about longitudinal axis 35.

The rotary hoe carriage 34 houses the rotary hoes 39 of the turf aerator 10, and the rotary hoes 39 are each supported on a drive shaft 41 of the turf aerator 10. A gear box 42 (FIG. 3) is mounted to the top surface of the rotary hoe carriage 34, between the upwardly extending side surfaces of mounting bracket 38. Power take-off shaft 44 of the tractor extends rearwardly of the tractor and its distal end is operatively connected in driving relationship of the gears in the gear box 42 by universal joint 43.

As illustrated in FIG. 3, jack shaft 47 is connected at one of its ends to gear box 42 and extends laterally toward bearing 48 at the side of the rotary hoe carriage 34, terminating at a sheave 49 (FIG. 3), which is affixed to the end of the jack shaft 47.

Figure 5:
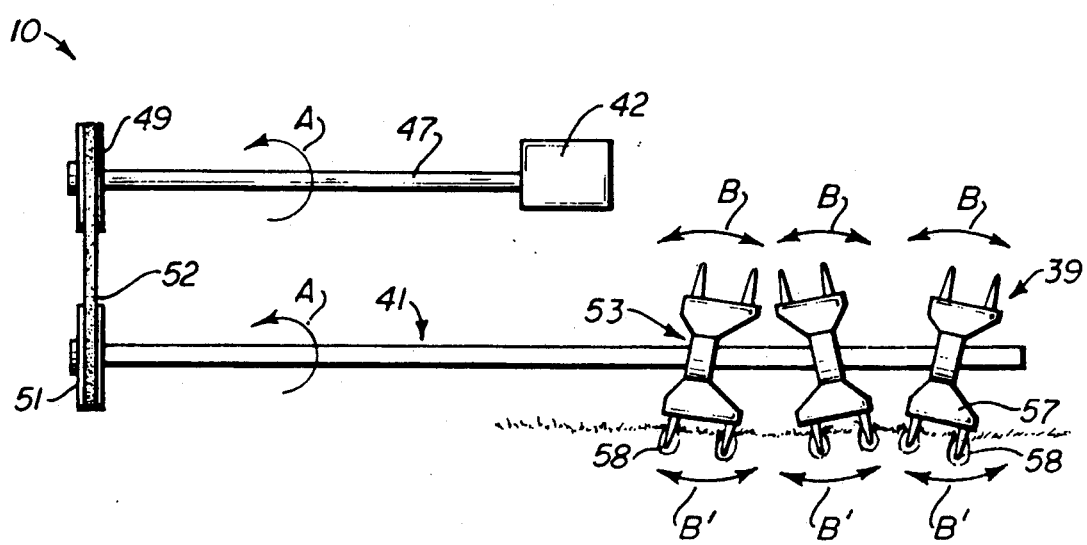
FIG. 5 is a schematic illustration of the side to side wobbling motion of the rotary hoes in response to the rotation of the drive shaft of the turf aerator.

As illustrated in FIG. 1, a second sheave 51 is rotatably mounted to the end of drive shaft 41 and is positioned below and in the same plane as sheave 49. A drive belt 52 surrounds both sheaves 49 and 51 in frictional contact with each sheave so as to cause the lower sheave 51 and drive shaft 41 to be rotated in response to the rotation of upper sheave 49. As FIG. 5 illustrates, the lower sheave 51 is mounted to one end of the drive shaft 41, which is square in cross section, upon which the rotary hoes 39 of the turf aerator 10 are supported.

Figure 6:
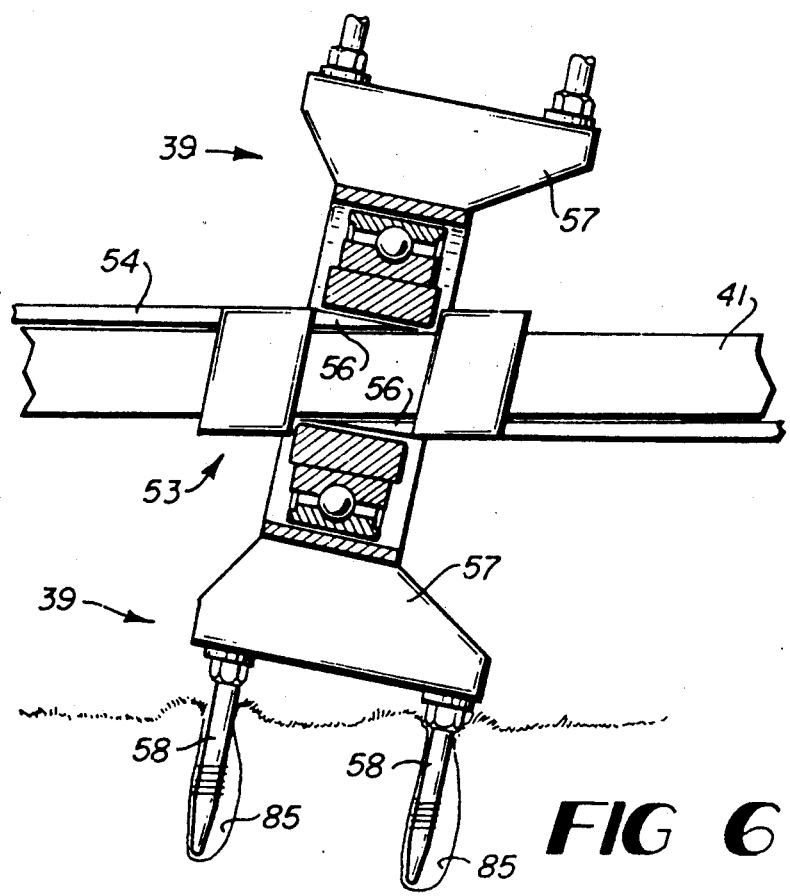
FIG. 6 is a partial end view of the turf aerator, showing a rotary hoe mounted on the drive shaft.

A plurality of rotary hoes 39 are mounted on drive shaft 41, with the rotary hoes 39 being spaced along the drive shaft 41. Each rotary hoe 39 includes a bearing 53 (FIG. 7) having an inner race 55 which includes an oversized "square" shaft opening 60 rigidly mounted to the drive shaft 41 in a canted or tilted attitude and an outer race 59 freely rotatable about the inner race 55. This tilted attitude or misalignment of the bearings 53 with the drive shaft 41 is due to the placement of L-shaped mounting sleeves 54 (FIG. 6) in the spaces along the drive shaft 41 between adjacent rotary hoes 39. Each mounting sleeve 54 is L-shaped in cross section and has wedge-shaped opposite ends 56.

One of the L-shaped mounting sleeves is placed along a corner of the square drive shaft 41 between adjacent rotary hoes, with alternate ones of the mounting sleeves 54 placed about opposite corner of the square drive shaft 41. The wedge-shaped ends 56 of each of the mounting sleeves 54 in effect form a new shaft with a canted alignment with respect to the drive shaft 41 and the bearings 53 are supported on these wedge-shaped ends. The wedge-shaped ends 56 project into opposite sides of the rotary hoes 39, into the oversized square shaft opening 60 of each bearing 53 and cause the bearings 53 to tilt with respect to the drive shaft. As a result, the bearings 53 are held in canted misalignment on drive shaft 41, with the axis of rotation of the bearings 53 arranged at an angle with respect to the longitudinal axis of the drive shaft 41.

Each rotary hoe 39 is freely rotatably mounted on its bearing 53 and rotates about the drive shaft 41. Triangular shaped tine holding blocks 57 are mounted to the outer rings of the bearing 53 at 45° intervals or at other equally spaced intervals about the outer ring 59 of bearing 53. Rectilinear replaceable solid core teeth or tines 58 are affixed to and extend radially from the holding blocks 57.

As illustrated in FIGS. 3 and 4, connecting chains 61 are attached at one end to an end of a horizontal cross bar 62 which extends laterally across the length of the turf aerator 10 and which is mounted to the upper end of tiltable support link 24. The chains 61 are held in place by a bolt 63 which extends downwardly through the cross bar 62. The chains 61 extend divergently (FIG. 3) from the cross bar 62 to the upper surface of a horizontal stabilizing bar 66 which is rigidly mounted to and moves with trailer unit 15, where each chain 61 is affixed to the upper surface of stabilizing bar 66 by bolts 67. The stabilizing bar 66 is supported above the upper surface of the elongated carriage support beam 33 of the trailer support frame 13 (FIG. 1) by an angled support strut or brace 68 which is welded to the upper surface of carriage support beam 33 and to the lower surface of stabilizing bar 66.

An angled support strap 69 welded at one end to the lower surface of stabilizing bar 66, attaches the stabilizing bar 66 to the upper surface of a support bar 71. Support bar 71 has a substantially L-shaped configuration and extends rearwardly and downwardly from the upper end portion of the vertical pivot joint 32. The support bar 71 is pivotably attached at its upper end to the upper surface of cross brace 18 by pivot pin 40 of the vertical pivot joint 32, and is fixedly attached at its lower end to an end of carriage support beam 33. A horizontal brace 72, welded to the lower surface of carriage support beam 33, is pivotally connected to the lower end (not shown) of pivot pin 40 of vertical pivot joint 32 so as to pivot about vertical pivot axis 14 at the lower surface of the cross brace 18. Thus, the carriage support beam 33 of trailer frame 13 is pivotably connected by vertical pivot joint 32 to the mounting frame 11.

The chains 61 and the vertical pivot joint 32 form a swing linkage connecting the trailer frame 13 to the mounting frame 11 to enable the trailer frame 13 to pivot or swing about the rear of the tractor 9, upwardly about lateral pivot axis 20 and laterally about upwardly extending pivot axis 14. Lock plate 77 is hingedly mounted to the rearwardly facing surface of crossbrace 18 by hinge 78. Lock plate 77 has a locking notch 81 (FIG. 4) formed approximately in the center of its rearmost edge portion. Locking protrusion 82 (FIG. 1) protrudes from the downwardly extending portion of the L-shaped support bar 71 and is received within locking notch 81 (FIG. 4) when lock plate 77 is in its horizontal altitude. The engagement of locking protrusion 82 by the locking notch 81 acts as a locking mechanism to resist the tendency of the turf aerator 10 (FIG. 1) to swing freely about the rear of the tractor 9 when in its fully raised position for transport to another worksite.

As illustrated in FIG. a lock plate linkage 83 is attached to a side surface of lock plate 77 by a connecting bar 84. The connecting bar 84 is welded at one end to a side surface of lock plate 77 and is pivotably connected to lock plate linkage 83 at its other end. Lock plate linkage 83 extends in a "dog-leg" configuration (FIGS. 3 & 4) around vertical pivot joint 32, and through an opening formed within the rear surface of tiltable support link 24, adjacent the side walls 27 of tiltable support link 24. A spring 86 is placed about the end of lock plate linkage 83 between a lock nut 87, mounted to the end of lock plate linkage 83, and an offset bracket 88 which abuts the forward most side surface of tiltable support link 24, as shown in FIG. 1. A stop tab 89 is welded to the lock plate linkage 83 on the opposite side of tiltable support link 24 from the offset bar 88 and spring 86. The stop tab 89 causes lock plate linkage 83 to be moved rearwardly as the lower portion of the tiltable support link 24 is moved rearwardly with the lowering of the turf aerator 10 toward the turf 22 to thus tilt lock plate 77 downwardly, thereby disengaging locking notch 81 from locking protrusion 82. When the turf aerator 10 is raised away from engagement with the turf 22, the lock plate linkage 83 is pulled forwardly as the tiltable support link 24 is tilted forwardly, thereby raising connecting bar 84 which in turn tilts lock plate 77 upwardly to thus lift locking notch 81 (FIG. 4) into engagement with locking protrusion 82 (FIG. 1) to lock the trailer frame 13 of the turf aerator 10 in aligned position behind the tractor for transport.

OPERATION

As illustrated in FIG. 1, the turf aerator 10 is hitched to the hydraulic lift system 12 of a conventional utility tractor 9 and is initially lifted away from the ground surface, with its tines 58 held out of engagement with the turf 22. Before aeration is begun, the operator tilts the turf aerator 10 downwardly toward the turf 22 by lowering the power arms 19 of the hydraulic lift system 12 of the tractor. The turf aerator 10 is positioned with the downwardly facing tines 58 of the rotary hoes 39 penetrating the turf 22 as shown in FIG. 1. Usually at least some of the weight of the turf aerator 10 remains supported upon the power arms 19 of the hydraulic lift system 12 and not completely upon the tines 58 of the rotary hoes 39 which are in engagement with the turf 22.

At the start of an aerating operation, the operator of the tractor engages the power takeoff shaft 44 of the tractor, causing the power takeoff shaft 44 to rotate. The gearing mechanism of the gear box 42 causes the jack shaft 47 to rotate in response to the rotation of the power takeoff 44. As the jack shaft 47 rotates (FIG. 3), the upper sheave 49, which is mounted to one end of the jack shaft 47, is also rotated. As the upper sheave 49 is rotated, it pulls the drive belt 52 about its circumference, causing the lower sheave 51 to rotate, and thus the square drive shaft 41 to which the lower sheave 51 is attached is caused to rotate in the direction of arrow A. Thus, the rotational speed of the drive shaft 41 is directly related to the rotation of the power takeoff 44 of the tractor. Accordingly, the greater the revolutions per minute (rpm) of the power takeoff 44, the faster the drive shaft 41 is rotated.

As the drive shaft 41 rotates, the eccentric mountings of the bearings 53 on the drive shaft 41 impart a revolving side-to-side wobbling motion to the rotary tine elements 42 as shown by arrows B and B, of FIG. 5. Thus, as the drive shaft 41 rotates, the rotary hoes 39 wobble or vibrate on the drive shaft 41. The faster the rotation of the drive shaft 44, the faster the wobbling action of the rotary hoes 39. When the turf aerator 10 is lowered toward the turf 22, the tines 58 of the rotary hoes 39 engage and penetrate the turf 22. The vibration of the rotary hoes 39 cause the tines 58 to burrow into the turf 22 as the tines 58 engage the turf 22 so as to form aeration holes 85 in the turf 22 without causing compaction.

The rate at which the tines 58 penetrate the turf 22 is a function of the speed of the side-to-side movements of the tines 58 and thus the rate of penetration of the tines 58 can be regulated by controlling the rpm's of the power takeoff 44 of the tractor which controls the speed of rotation of the drive shaft 41. In general, for most uses, the speed of the drive shaft 41 should be maintained at between 600 and 700 rpm. If greater or more rapid depth of penetration is required, the speed of rotation of the drive shaft 41 can be increased to increase the agitation of the rotary hoes 39. The increased agitation of the rotary hoes 39 causes the tines 58 to burrow into the turf 22 at a faster rate.

Figure 7:
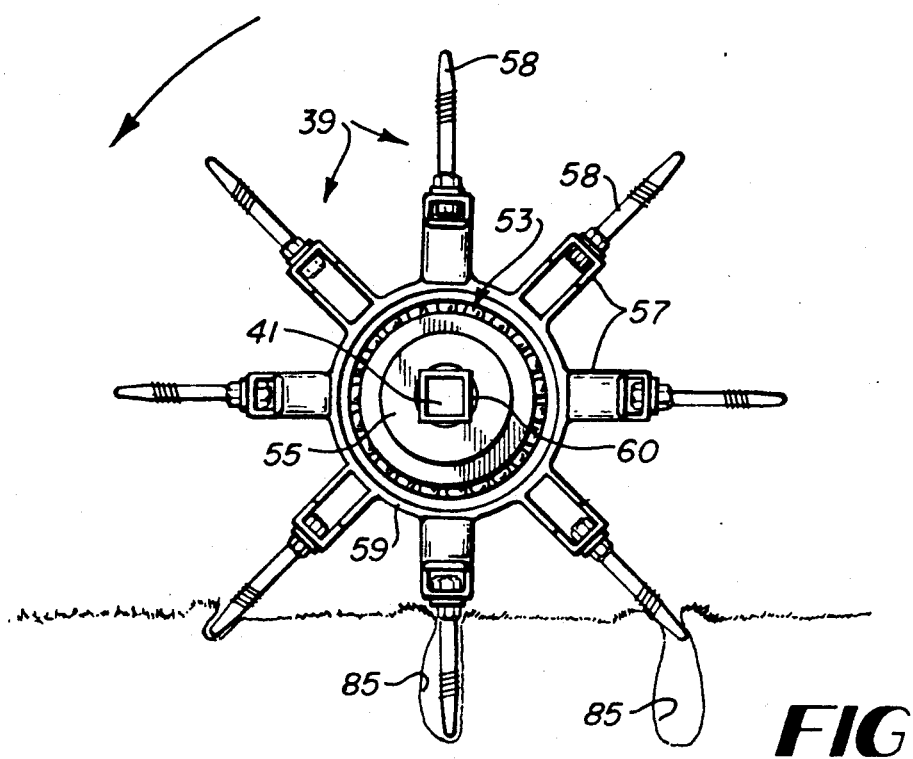
FIG. 7 is a side elevational view of the rotary hoes mounted on the drive shaft of the turf aerator, illustrating the forward "walking" motion of the rotary hoes.

When the drive mechanism of the tractor is engaged and the tractor begins to move forwardly or rearwardly over the surface of the turf 22, the rotary hoes 39 will tend to "walk" in the turf 22 as illustrated in FIG. 7. Thus, the rotary hoes 39 will be freely rotated about the drive shaft 41 as the tractor moves forwardly, so as to rotate into and out of engagement with the turf 22, to thereby aerate the turf 22. If the power takeoff 44 of the tractor is also engaged, the tines 58 of the rotary hoes 39 will vibrate from side to side, burrowing into the turf as they walk forward to further aerate the turf 22. If the power takeoff shaft 44 is not engaged, the rotary hoes 39 will simply walk forward in the turf 22 in a similar manner to conventional aerators.

As illustrated in FIG. 7, the tines 58 initially penetrate the turf 22 at an angle. As the rotary hoes 39 walk forward, the tines 58 penetrate into the turf 22 in a downwardly arcing motion until the tines 58 ar fully extended in a vertical alignment in the soil. At this point, the tines 58 begin to move in an upward arc toward the surface of the turf 22 with the continued walking motion to the rotary hoes 39 over the turf surface. As a result of the elliptical movement of the tines 58 into and out of engagement with the turf 22, a tear-shaped aeration hole 85 is formed in the turf 22. Simultaneously, the side-to-side wobbling motion of the tines 58 causes the tines to enlarge the sides of the aeration hole 85 in the direction normal to the rotational movement of the tines 58. The resultant aeration hole 85 is a tear-shaped hole having a relatively small opening in the turf surface, while the portion of the aeration hole 85 below the turf surface is wider than the breadth of the tines 58.

Upon the completion of a turf aerating operation, the operator deactivates the power takeoff 44 of the tractor and raises the power arms 19 (FIG. 1) of the tractor's hydraulic lift 12 system so as to lift the turf aerator 10, to remove the tines 58 of the rotary hoes 39 from engagement with the turf 22. At first, the weight of the trailer unit 15 causes the trailer frame 13 to remain supported on the ground as the trailer frame and hitch A-frame 16 pivot clockwise (FIG. 1) about lateral axis 20 (FIG. 3) of pivot pins 21 and as the hitch A-frame is lifted away from the ground. In the meantime, the tiltable support link 24 tilts in a counter clockwise direction about both its upper and lower ends, increasing the distance between the horizontal cross bar 62 and the horizontal stabilizing bar 66, causing the chains 61 to become taut. After the chains are stretched, further upward movement of the power arm 19 of the tractor 9 results in a corresponding lifting of the trailer unit 15. If the trailer frame 13 is angled with respect to the mounting frame 11 (FIG. 4) when the trailer unit 15 is being lifted from the ground, as when the tractor has moved through a turn, one of the chains 61 will become taut before the other chain, causing the trailer frame 13 to swing back toward longitudinal alignment behind the mounting frame 11 until the other chain becomes taut. Thus, the chains 61 act as a limiting means for limiting the downward tilting motion of the trailer frame 13 and as a centering means to perform the function of centering the trailer frame 13 behind the tractor in position for transport to another site.

Further, as the turf aerator is lifted and tiltable support link 24 tilts forwardly, the forwardly facing side surface of the tiltable support link 24 moves the offset bracket 88 forwardly. As offset bracket 88 is urged forwardly, it compresses spring 86 against locknut 87, thereby causing lock plate linkage 83 to be pulled forwardly. As lock plate linkage 83 moves forwardly, it tilts connecting bar 84 and lock plate 77 about their hinge 78, raising the lock plate 77 toward a horizontal altitude so that the locking notch 81 will be located at a level to receive the locking protrusion 82. If the trailer frame 13 is not properly centered behind the tractor, lock plate 77 is biased by spring 86 against the lower edge of locking protrusion 82, and locking protrusion 82 slides along the lower edge of the locking plate as the chains tighten and urge the trailer frame 13 about the rear of the tractor toward a centered position. As the trailer frame 13 is centered, locking notch 81 becomes aligned with locking protrusion 82 enabling lock plate 77 to tilt further upwardly in response to the bias of spring 86 so that locking protrusion 82 is engaged within locking notch 81. The engagement of the locking protrusion 82 within this locking notch 81 functions as a locking means to lock the trailer frame 13 in alignment with the mounting frame 11 and to the prevent the turf aerator 10 from swinging freely about the rear of the tractor as it is transported to another job site.

While a specific trailer unit 15 has been disclosed as being mounted in trailing or locked relationship behind the mounting support frame 11, other types of trailer unit tillage or landscaping implements ca be mounted behind the mounting support frame, if desired. Moreover while this invention has been described in detail, it should be understood that the described embodiment merely illustrates the preferred form of the invention and other variations or modifications may be made thereto without departing from the spirit and scope of the invention as set forth in the following claims.

I claim:

1. A turf aerator for penetrating and loosening soil adjacent the surface of the ground comprising a frame for mounting to a tractor or the like, a drive shaft supported by said frame, a plurality of rotary hoes mounted on said drive shaft and freely rotatable about said drive shaft, each of said rotary hoes including a bearing and a plurality of tines extending radially outwardly from said bearing for penetrating the soil over which said drive shaft is moved by the frame and for rotating about said drive shaft in response to movement of said rotary hoes along the ground surface, the improvement therein of means for urging the tines of said rotary hoes laterally with respect to the direction of movement of said frame, whereby the tines penetrate the soil and tend to form openings in the soil that are wider than the breadth of said tines.

2. The soil treatment of claim 1 wherein said means for urging the tines of said rotary hoes laterally with respect to the direction of movement of said frame comprises means for wobbling said rotary hoes on said drive shaft.

3. The soil treatment apparatus of claim 1 wherein said means for urging said tines of said rotary hoes laterally with respect to the direction of movement of said frame comprises means for mounting each of said rotary hoes freely rotatably about said drive shaft and about an axis of rotation oriented at an angle with respect to said drive shaft, and means for rotating said drive shaft with the axes of rotation of each rotary hoe revolving about said drive shaft.

4. The soil treatment apparatus of claim 1 wherein said means for urging said tines of said rotary hoes laterally with respect to the direction of movement of said frame comprises bearing means mounting each rotary hoe freely rotatably about said drive shaft, means maintaining each said bearing means at an angle with respect to said drive shaft so that each rotary hoe rotates freely about an axis of rotation oriented at an angle with respect to said drive shaft and means for revolving the axes of rotation of the rotary hoes about said drive shaft.

5. A turf aerator of the type supported on and carried by the power arms of the hydraulic system of a utility tractor and powered by the power take-off of the tractor, said aerator comprising:
a frame;
a support means attached to said frame for connection to the power arms of the hydraulic system of the tractor;
a drive shaft mounted within said frame and having a plurality of rotary hoes freely rotatable thereon;
a drive means for connection to the power take-off of the tractor and connected to said drive shaft for rotating said drive shaft in response to the rotation of the power take-off of the tractor;
means responsive to the rotation of said drive shaft for causing said rotary hoes to wobble; and
whereby as said drive shaft is rotated with the rotation of the power take-off of the tractor, said tine elements are vibrated so as to disturb the turf as said tine elements penetrate the turf.

6. The turf aerator of claim 5 and wherein said means responsive to the rotation of said drive shaft to wobble said rotary hoes comprises a plurality of bearings eccentrically mounted on said drive shaft in a canted alignment for supporting said rotary tine elements on said drive shaft wherein as said bearings rotate with said drive shaft, said tine elements are moved laterally transverse to the rotational movement of said drive shaft.

7. The turf aerator of claim 5 and wherein said drive means comprises a gear means mounted upon an upper surface of said frame and connected in a drive relationship to the power take-off of the tractor, a jack shaft extending along the upper surface of said frame from said gear means, an upper sheave mounted to an end of said jack shaft opposite said gear means, and a lower sheave attached to an end portion of said drive shaft and mounted to said frame below and parallel to said upper sheave and linked to said upper and lower sheaves, whereby as the power take-off of the tractor rotates, said gear means engages said jack shaft causing said upper sheave to rotate and engage said drive belt, thereby rotating said lower sheave and said drive shaft.

8. The turf aerator of claim 5 and wherein said support means comprises a V-shaped hitch frame having a pair of elongated vertical support members each pivotally attached to a power arm of the hydraulic lift system of the tractor and a horizontal support member between said vertical support members, for supporting said aerator from above the turf;
a hitch plate pivotally attached to said horizontal support member at its lower end and to the stabilizing arm of the hydraulic lift system of the tractor for enabling said aerator frame to tilt vertically to follow the contour of the turf;
a longitudinal support beam having one end mounted to said horizontal support member and an opposite end attached to said aerator frame; and
a vertical pivot joint pivotally connecting said hitch frame to said longitudinal support beam for enabling said aerator frame to swivel to follow the tractor as it turns.

9. A method of loosening the soil beneath the surface of the ground with a plurality of rotary hoes each of the type including a hub having an axis of rotation and tines extending radially outwardly from the axis of rotation, comprising the steps of:
moving the plurality of rotary hoes downwardly until some of the radially extending tines penetrates the surface of the ground;
moving the rotary hoes in a forward direction,
in response to the movement of the rotary hoes in a forward direction rotating the rotary hoes so as to cause their tines to successively walk through the soil, and wobbling the rotary hoes independently of the walking movement of the rotary hoes to burrow the tines downwardly into the soil.

10. The method recited in claim 9 wherein the step of wobbling the rotary hoes includes the steps of mounting each rotary hoe about a longitudinal drive shaft with the axis of rotation of each rotary hoe disposed at an angle to the length of the drive shaft and rotating the drive shaft about its length.

11. An apparatus for aerating turf of the type hitched to the hydraulic lift system of a tractor and powered by the power-takeoff of the tractor, comprising:
   a frame;
   a hitch means for mounting an end of said frame upon the hydraulic lift system of the tractor;
   a plurality of freely rotatable rotary hoes supported by said frame, said rotary hoes each including a hub and tines extending radially from its hub and arranged to penetrate and walk through the turf beneath said frame in response to the movement of the frame across the turf;
   means for operative connection to the power take off of the tractor for vibrating said rotary hoes laterally in a direction normal to the direction of movement of said rotary hoes independently of the rotary movement of said rotary hoes as said rotary hoes penetrate the turf.

12. The apparatus of claim 11 and wherein said means for vibrating said rotary hoes comprises a substantially square drive shaft, and a plurality of bearings mounted upon said drive shaft and upon which said rotary hoes are supported on said drive shaft with the axis of rotation of each rotary hoe disposed at an angle with respect to the length of said drive shaft, whereby as said drive shaft rotates, a wobbling motion is imparted to said rotary hoes.

13. The apparatus of claim 12 and further including a plurality of mounting sleeves positioned along said drive shaft between each of said bearings and having opposite ends, and wedge portions formed at said opposite ends of said mounting sleeves for insertion between each of said bearings and said drive shaft so as to urge said bearings into a canted alignment on said drive shaft.

14. The apparatus of claim 12 and wherein each of said rotary hoes further comprises a bearing including an inner race mounted to drive shaft and an outer ring rotatable about said inner race, and at least one tine mounted upon each of said outer rings for penetrating the turf and forming aeration holes therein.

15. A trailer unit tillage or landscaping implement for mounting to the power lift assembly of a towing tractor in which the power lift assembly of the towing tractor includes a pair of lower power arms and an upper stabilizing arm, said trailer unit tillage or landscaping implement comprising:
   an A-frame including a cross brace and a pair of A-frame side arms extending downwardly from said cross brace, said side arms each for pivotably mounting at their lower ends to the power arms of the hydraulic lift of the tractor and defining with said power arms a lateral pivot axis;
   pivot joint mounted in the upper cross brace of said A-frame defining an upwardly extending pivot axis;
   a trailer unit pivotably mounted to the upper portion of said A-frame at said pivot joint and pivotable about said upwardly extending pivot axis;
   an upwardly extending tiltable support link for pivotably mounting at its upper end to the stabilizing arm of the power lift assembly of the tractor; and
   limiting means connected between the upper end of said tiltable support link and said trailer unit for limiting the downward tilting movement of the trailer unit about the lateral pivot axis.

16. The trailer unit tillage or landscaping implement of claim 15 and wherein said limiting means comprises biasing means for urging said trailer unit toward a centered position behind the tractor in response to the trailer unit pivoting downwardly about said lateral pivot axis.

17. The trailer unit tillage or landscaping implement of claim 16 and wherein said biasing means comprises a pair of chain members each connected at its ends between said tiltable support link and said trailer unit and displaced laterally on opposite sides of said upwardly extending pivot axis and arranged for each chain means to become more taut in response to the trailer unit being pivoted about said upwardly extending pivot axis in the opposite direction from the chain and said chains arranged to both become taut in response to the trailer unit pivoting downwardly about said lateral axis.

18. The trailer unit tillage or landscaping implement of claim 15 and further including locking means for locking the trailer unit in aligned position behind the tractor.

* * * * *